Figure 1:

Aug. 31, 1937.  A. MURRAY  2,091,715

PHOTOMECHANICAL RESIST

Filed March 19, 1935

2 — Sensitive crystallizable layer containing wax.
1 — Support; glass or metal.

2' — Sensitive crystallizable layer; may contain wax.
3 — Layer containing a triphenylmethane dye.
1 —

INVENTOR:
Alexander Murray,
BY
ATTORNEY.

Patented Aug. 31, 1937

2,091,715

UNITED STATES PATENT OFFICE 2,091,715

PHOTOMECHANICAL RESIST

Alexander Murray, Rochester, N. Y., assignor, by mesne assignments, to Eastman Kodak Company, Jersey City, N. J., a corporation of New Jersey Application March 19, 1935, Serial No. 11,820
In Canada and Great Britain April 26, 1934

5 Claims. (Cl. 95—7)

This invention relates to a photo-mechanical resist or light sensitive enamel, such as is used in coating metal, light printing upon it from a halftone or line negative, developing and then etching, and specifically to an improvement in the invention described in United States Patent No. 1,965,710, granted July 10, 1934.

While the resists therein described are satisfactory with metal plates, they have a tendency to strip from glass.

When the resist is to be used on a glass surface, it is more difficult to secure adherence, but I have discovered that this difficulty is overcome if a small amount of natural or synthetic wax or wax-like body is added, examples being Montan wax, beeswax, carnauba wax and chlorinated wax such as monochlornaphthalene or trichlornaphthalene as sold commercially, and by the term wax, as used in the claims I include all such bodies. A formula for use on glass is the following:

| | Grams |
|---|---|
| Dicinnamal acetone | 4.5 |
| Syrian asphaltum | 9.0 |
| Phenol | 2.0 |
| Trichlornaphthalene | 1.5 |
| Solvent naphtha | 50.0 |
| Toluene | 33.0 |

This resist is insoluble in water, is resistant to hydrofluoric acid when used as an etch for glass and adheres firmly to glass in the presence of water or acids.

Adherence to glass is further improved if the glass is first coated with a sub-layer containing as an essential ingredient a triphenylmethane dye such as fuchsine; malachite green, methyl violet or ethyl violet. More or less resin may be added to the dye solutions to decrease its solubility in water and improve the flowing property. A preferred formula for the sub-layer as applied is as follows:

| | Grams |
|---|---|
| Malachite green | 1.00 |
| Gum mastic | .04 |
| Toluene | .50 |
| Denatured alcohol | 90.46 |
| Iso-propyl alcohol | 8.00 |

After this has been coated on glass and dried by evaporation, a resist layer which need not contain wax is applied. This expedient gives a layer that has good adherence to glass and may be used in forming etched designs in glass. It is useful also with the formulae given in the patent mentioned.

Various substances may be used with the materials mentioned, as diluents or modifiers. These may be employed either to reduce the cost of the enamel, or to modify its characteristics. Such substances are for example, coumarin, m-nitro-benzaldehyde, p-nitroaniline, B-naphthol, p-nitro acetanilide, nitro-brombenzene and p-nitro phenol.

A method of using these enamels is as follows: The metal, copper, glass or zinc is scrubbed with pumice and water, rinsed, and the water polished off with a towel. Drying the water off on a whirler appears less satisfactory. After the plate is dry, it is coated in an amber or orange light. The plate is then dried without heat in the dark for at least five minutes.

As an alternative developer kerosene may be used, the action of which may be arrested by the use of soap and water. This is particularly useful for formulae including a wax. Other developers for resists of the type described are iso-propyl alcohol, mixtures of kerosene and iso-propyl alcohol, triethanolamine and mixtures of triethanolamine with glycerine or ethylene glycol.

Figure 2:
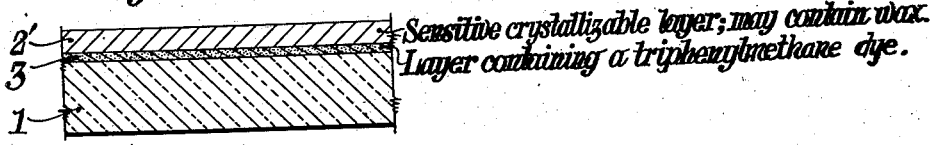

In the accompanying drawing, Fig. 1 is a section on an exaggerated scale of a support coated with my improved resist;

Fig. 2 is a similar section showing the dye sub-layer.

In each of the figures, 1 is a support preferably of glass, but which may be of metal, and which may be of any desired shape, such as those described in my copending application Serial No. 727,304, filed May 24, 1934, of which this is a division. The layer 2 is a sensitive layer of the type described in this application and containing a wax. It is to be understood that in place of dicinnamal acetone, any other material of the type described in my Patent 1,965,710 may be used.

In Fig. 2, a similar support 1 is shown coated first with a layer 3 comprising a triphenylmethane dye as previously described and over this a sensitive layer 2' of the type described which may or may not include a wax.

I consider as included within my invention all variations and equivalents coming within the scope of the appended claims.

What I claim is:

1. A photo-mechanical resist comprising a crystallizable, halogen-free, organic, light sensitive substance capable of autogenic formation of insoluble, chemically resistant, non-crystalline products of higher melting point when exposed to light, together with a synthetic wax soluble in the resist mixture and a chemically indifferent substance which inhibits the crystallization of the light sensitive material, so that said light sensitive material is maintained in a non-crystallized state during exposure, the wax being homogeneously dissolved in the resist in the amount of approximately 11% of the amount of solids in the resist.

2. A light sensitive composition including in a non-crystalline state an unsaturated organic compound, light sensitive in itself, having the tendency to crystallize and having the property when in non-crystalline state of isomerization under the influence of light and having such property to a very much less extent when in the crystalline state, a synthetic wax soluble in the resist mixture and a colloid substance which inhibits the crystallization of the compound, the wax being homogeneously dissolved in the resist in the amount of approximately 11% of the amount of solids in the resist.

3. A composition for use as a photo-mechanical, light sensitive resist, including in solution an organic compound containing the ethylene linkage

said substance being light sensitive in itself, and having the property when in non-crystalline state of isomerization under the influence of light, and having such property to a very much less extent when in the crystalline state, and having a tendency to crystallize out of the solution, and a colloidal substance which inhibits the crystallization of the compound, and a synthetic wax soluble in the resist mixture, the wax being homogeneously dissolved in the resist in the amount of approximately 11% of the amount of solids in the resist.

4. A sensitive element comprising a glass support and a solid sensitive layer thereon, said layer comprising in a non-crystalline state a ketone containing the linkage

said ketone being in itself appreciably light sensitive only when in a non-crystalline state and having a tendency to crystallize, together with a colloid material which is inert with regard to the chemical and light sensitive properties of said ketone but which inhibits its crystallization, and a wax, the wax being homogeneously dissolved in the resist in the amount of approximately 11% of the amount of solids in the resist.

5. A sensitive element comprising a glass support and a solid sensitive layer thereon, said layer comprising in a non-crystalline state a ketone containing the linkage

the ketone being in itself appreciably light sensitive only when in a non-crystalline state and having a tendency to crystallize, together with a resin which is inert chemically and photogenically toward the ketone but inhibits its crystallization, and a wax, the wax being homogeneously dissolved in the resist in the amount of approximately 11% of the amount of solids in the resist.

ALEXANDER MURRAY.